United States Patent [19]

Ebato et al.

[11] 4,324,828

[45] Apr. 13, 1982

[54] STRUCTURE OF POSITIVE PLATE OF ENCLOSED TYPE BATTERY

[75] Inventors: Noboru Ebato; Toshiki Kahara; Kohki Tamura, all of Ibaraki, Japan

[73] Assignees: Hitachi, Ltd.; Hitachi Chemical Co., Ltd., both of Tokyo, Japan

[21] Appl. No.: 157,001

[22] Filed: Jun. 6, 1980

[30] Foreign Application Priority Data

Jun. 29, 1979 [JP] Japan ................... 54-81335

[51] Int. Cl.$^3$ ............................................. H01M 4/00
[52] U.S. Cl. .................................. 429/209; 49/218; 429/224
[58] Field of Search ............ 429/218, 224, 212, 214, 429/215, 216, 217, 194, 209

[56] References Cited

U.S. PATENT DOCUMENTS

| | | | |
|---|---|---|---|
| 1,272,406 | 7/1918 | Ellis | 429/224 |
| 1,484,918 | 2/1924 | Wilker | 429/224 |
| 3,242,013 | 3/1966 | Mehne et al. | 429/224 |
| 4,060,668 | 11/1977 | Goebel | 429/218 |
| 4,172,183 | 10/1979 | Ruetschi | 429/224 |
| 4,197,366 | 4/1980 | Tamura et al. | 429/224 |

*Primary Examiner*—Donald L. Walton
*Attorney, Agent, or Firm*—Thomas E. Beall, Jr.

[57] ABSTRACT

A positive plate composite agent consisting of a mixture of manganese dioxide, carbon powder and polytetrafluoroethylene powder is press-molded at a pressure in the range of 1 to 5 t/cm$^2$. The resulting molded article is then pulvertized into massive particles having a particle size ranging from 0.03 to 15 mm$^3$. The massive particles are then press-molded into a positive plate having a predetermined shape at a pressure in the range of 0.2 to 1 t/cm$^2$.

There is thus obtained a positive plate of an enclosed type battery which comprises a portion consisting of the compactly formed massive particles of the positive plate composite agent and a portion consisting of the coarsely formed small particles of the composite agent interposed between the massive particles so as to define paths or voids for the passage of an electrolyte.

7 Claims, 9 Drawing Figures

STRUCTURE OF POSITIVE PLATE OF ENCLOSED TYPE BATTERY

BACKGROUND OF THE INVENTION

This invention relates to an enclosed type battery and more specifically to a structure of a positive plate used for this battery and a production method of the positive plate.

The positive plate of the enclosed type battery such as a button type battery or a coin type battery is generally produced by solidifying powder of an inorganic compound by molding or the like method. For this reason, the positive plate has essentially the property of allowing the impregnation of a liquid and keeping the liquid. On the other hand, it is a recent trend to increase the density of the positive plate as highly as possible in order to increase the energy density (wh/g, wh/ml). Accordingly, voids of the positive plate are reduced and it becomes difficult to impregnate the positive plate with an electrolyte.

U.S. Pat. No. 4,060,668 solves this problem by forming a material of the positive plate by an aggregate of porous semi-rigid particles having the composition consisting of about 40 to 99% by weight of carbon black, at least 1% by weight of a mechanical binder, which is inert inside the battery to be used, and the balance of graphite so that a number of liquid paths are formed between adjacent particles to allow the electrolyte to sufficiently diffuse into the positive plate material during the service life of the battery. However, this method involves the problem in that since the density of the positive plate is reduced, the energy density is also reduced accordingly.

SUMMARY OF THE INVENTION

It is therefore an object of the present invention to provide a structure of the positive plate of the enclosed type battery which shortens the impregnation time of the electrolyte and enhances a utilization ratio of the battery, and also a production method of the positive plate.

It is another object of the present invention to provide a structure of the positive plate of the enclosed type battery which shortens the production time, increases the energy density and facilitates the production of the enclosed type battery, and also a production method of the positive plate.

The abovementioned objects of the invention can be accomplished by forming the positive plate of the enclosed type battery by a portion in which a composite agent containing an active material for the positive plate is compactly formed, and a portion in which the composite agent is coarsely formed.

The positive plate of the enclosed type battery in accordance with the invention is produced by the production method consisting of the following three steps, i.e., the first step of press-molding the composite agent containing the active material for the positive plate at a predetermined pressure; the second step of pulverizing the molded article formed by the first step into particles of a predetermined particle size; and the third step of press-molding the particles formed by the second step into the positive plate of a predetermined shape at a pressure lower than that of the first step.

In accordance with the present invention, the electrolyte is allowed to impregnate the positive plate within a short period of time through voids that are present in the portion where the composite agent is coarsely formed; thence it permeates into the portion where the composite agent is compactly formed.

Because of the abovementioned arrangement, the permeation of the electrolyte into the plate is improved and the time required for the permeation step of the electrolyte during the production of the battery is reduced down to $\frac{1}{4}$ to 1/5 of the time required conventionally. Further, since the electrolyte is allowed to uniformly permeate, the utilization ratio can also be improved.

These and other objects and features of the present invention will become more apparent from the following description thereof, when read in conjunction with the accompanying drawings.

DETAILED DESCRIPTION OF THE PREFERRED EMBODIMENT

Figure 1:
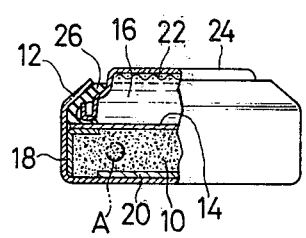
FIGS. 1 and 2 are partial sectional views of a button type battery and a coin type battery using the positive plate in accordance with the present invention, respectively.
Figure 2:
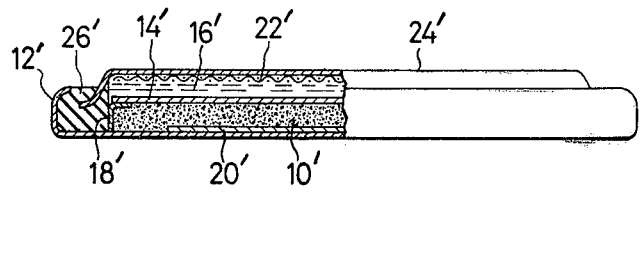

In FIGS. 1 and 2, there are shown a button type battery and a coin type battery each using the positive plate of the present invention as examples of the enclosed type battery.

The positive plate in accordance with the present invention comprises a composite agent 10 consisting of an active material for the positive plate such as manganese dioxide, an electro-conductive agent such as carbon powder and a binder such as polytetrafluoroethylene powder, and is arranged to oppose a negative plate 16 consisting of a light metal, such as lithium, inside a positive plate casing 12 via a separator 14.

A seat 18 is disposed between the inner circumferential surface of the positive plate casing 12 and the outer circumferential surface of the positive plate composite agent 10 and supports the positive plate composite agent 10. A positive plate current collector plate 20 is interposed between the bottom surface of the positive plate casing 12 and that of the positive plate agent 10.

A negative plate current collector net 22 is placed on the upper surface of the negative plate 16 and they are covered with a negative plate upper lid 24. The positive plate casing 12 and the negative plate upper lid 24 are sealed via a gasket 26.

In FIG. 2, corresponding numerals, with primes, are employed for corresponding parts, which differ only in external shape as seen from the drawing.

Figure 3:
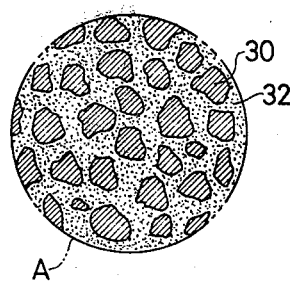
FIG. 3 is a partial, enlarged sectional view showing the structure of the positive plate of the invention.

As diagrammatically shown in the partial enlarged view in FIG. 3, the positive plate of the present invention consists of a portion 30 where the positive plate composite agent containing the positive plate active material, the electro-conductive agent and the binder is compactly formed and a portion 32 where the positive plate composite agent is coarsely formed. The compact portions are arranged such that at least a part thereof comes into contact with the coarse portion and they become adjacent to each other via this coarse portion.

The compact portion is preferably formed by massive particles consisting of the positive plate composite agent that is compactly aggregated at a predetermined pressure, e.g., 1 to 5 t/cm² while the coarse portion is preferably formed by small particles of the composite agent that is coarsely aggregated at a pressure lower than the abovementioned pressure, e.g., 0.2 to 1 t/cm² so that paths or voids for the passage of the electrolyte are defined between these massive particles. According to this arrangement, the electrolyte is allowed to first permeate through the entire positive plate through the coarse portions and then gradually into the compact portions from their peripheral portions. This arrangement provides the advantages that the impregnation time of the electrolyte is shortened and the utilization ratio of the battery is improved.

Since the impregnation time of the electrolyte into the plate is shortened as described above, the time required for the impregnation step of the eletrolyte during the production process of the battery can be reduced to ¼ to 1/5 of the time required conventionally. Further, since the electrolyte is allowed to uniformly impregnate the entire positive plate, the utilization ratio can be improved by 10% for the button type battery and by 3 to 5% for the coin type battery in terms of the ratio till the voltage drops to 2 V in a lithium/manganese dioxide battery, as exemplified by experiments.

Figure 4A:
FIGS. 4A, 4B and 4C are schematic views showing other constructions of the positive plate of the invention, respectively.
Figure 4B:
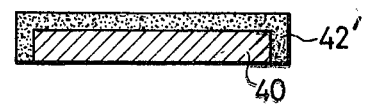
Figure 4C:
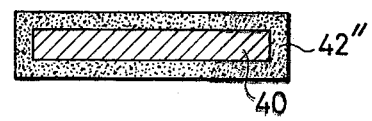

FIGS. 4A, 4B and 4C diagrammatically illustrate other structures of the positive plate in accordance with the present invention. FIG. 4A shows a structure wherein the composite agent is coarsely formed only at a part 42 of the compact portion 40 such as only on its upper surface, for example. FIG. 4B shows a structure wherein the coarse portion 42' is formed over the entire surface of the compact portion 40 except only its part such as the bottom surface, for example. FIG. 4C shows a structure wherein the coarse portion 42" is formed over the entire surface of the compact portion 40.

In FIGS. 4A, 4B and 4C, the portion 40 where the composite agent is compactly formed consists of a molded article obtained by press-molding the composite agent at a predetermined pressure, e.g., 1 to 5 t/cm² while the portion 42 where the composite agent is coarsely formed consists of particles obtained by press-molding the composite agent at a predetermined low pressure, e.g., 0.2 to 1 t/cm², and then pulverizing the mold, or particles obtained by granulating the composite agent at normal pressure, or the powder of the composite agent. According to this arrangement, the electrolyte is allowed to impregnate from the surface into the interior of the positive plate or from local parts to the entire portions of the positive plate, thereby shortening the impregnation time and improving the utilization ratio.

Figure 5:
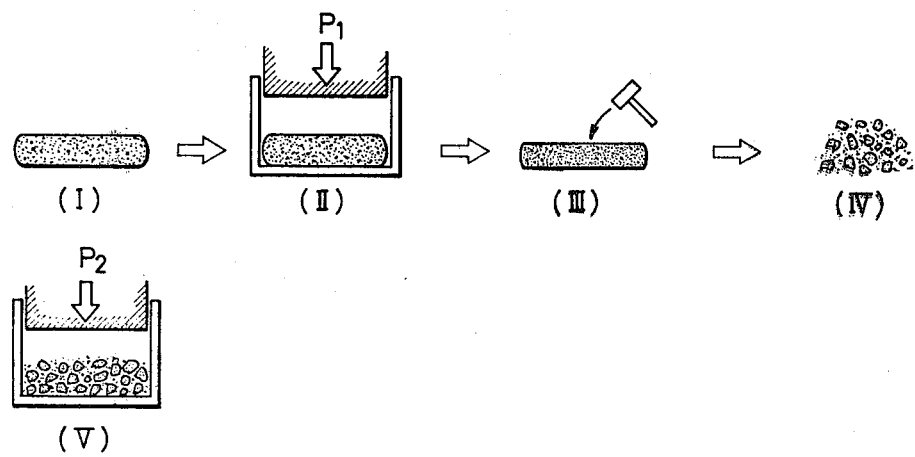
FIG. 5 is a schematic view showing step-wise the production method of the positive plate of the invention.

The production method of the positive plate having the internal structure such as shown in Example 1 is step-wise illustrated in FIG. 5.

The positive plate composite agent is first formed by mixing the positive plate active material such as manganese dioxide, the electro-conductive agent such as carbon powder and the binder such as polytetrafluoroethylene (step I). Next, the resulting composite agent is press-molded at a predetermined pressure $P_1$ (step II). The pressure $P_1$ ranges from 1 to 5 t/cm² and is preferably 2 t/cm². The positive plate composite agent press-molded at the pressure $P_1$ is pulverized into massive particles of a predetermined particle size by known pulverization methods (steps III, IV). The size of the massive particles is from about 0.03 to about 15 mm³ and is preferably below 10 mm³.

The massive particles thus formed into the predetermined size are then press-molded into the positive plate of a predetermined shape at a predetermined pressure $P_2$ which is lower than the abovementioned pressure $P_1$ (step V). This predetermined pressure $P_2$ is from 0.2 to 1 t/cm² and is preferably 0.5 t/cm².

The positive plates of FIGS. 4A, 4B and 4C, each having a different structure in accordance with the present invention, are produced, after the step II of FIG. 5, by covering the surface of the press-molded article obtained by the step II on its upper surface, its entire surface except the lower surface and its entire surface, respectively, with the particles or powder of the coarsely formed composite agent for the positive plate as shown in FIGS. 4A, 4B and 4C, respectively.

The present invention will be understood more definitely from the following examples thereof.

EXAMPLE 1

A positive plate composite agent consisting of a uniform mixture of 13 parts by weight of manganese dioxide, 1 part by weight of carbon powder and 1 part by weight of polytetrafluoroethylene was press-molded at a pressure of 2 t/cm² and was pulverized, thereby yielding particles falling within the range of 0.03 to 15 mm³. 0.4 g of the particle was packed into a stainless steel positive plate casing at a pressure of 0.5 t/cm². After the positive plate casing was dipped into an electrolyte, obtained by dissolving lithium chlorate in a concentration of 1 mol/l in a 1:1 mixed solvent of propylene carbonate and 1,2-dimethoxyethane, for four hours. Next, a button type battery A (diameter=11.5 mm, thickness=5.5 mm) of the structure shown in FIG. 1 was produced using lithium as the active material for the negative plate.

Separately, using 0.95% of the abovementioned particle of the mold, the positive plate was produced by molding at a pressure of 0.5 t/cm². Using the resulting positive plate, a coin type battery B (diameter=24.5 mm, thickness=3.0 mm) was produced in the same way as above.

EXAMPLE 2

To 15 parts by weight of the abovementioned particle primarily molded in Example 1 was added 0.2 parts of a carbon fiber (diameter=5 μm, length=about 1 cm). They were mixed while care was taken so as not to disrupt the particle. 0.37 g of the mixture was sampled and directly packed into the positive plate casing under the secondary molding at a pressure of 0.5 t/cm² in the same way as the battery A of Example 1. The casing was then dipped in the electrolyte for four hours so as to allow the electrolyte to impregnate the positive plate. In the same way as in Example 1, a button type battery C was then produced.

Comparative Example 0.4 g of the positive plate composite agent having the same composition as that of Example 1 was collected and packed directly into the positive plate casing under the molding at a pressure of 1.5 t/cm$^2$. The casing was then dipped into the electrolyte for 20 hours. As a result, 90% of the pores of the positive plate was filled with the electrolyte. Using this positive plate, a button type battery A' was produced in the same way as in the abovementioned battery A.

A coin type battery B' was also produced separately in the same way as the battery B of Example 1 except that 0.95 g of the positive plate composite agent was molded at a pressure of 1.5 t/cm$^2$ without the primary molding and then dipped into the electrolyte for 20 hours to allow the electrolyte to impregnate the positive plate.

After a fixed resistor was connected to each of the batteries obtained in Examples and Comparative Example (18KΩ for the button type and 3KΩ for the coin type), each battery was allowed to discharge continuously in a room to observe the characteristics of the discharge voltage with the passage of time.

Figure 6:
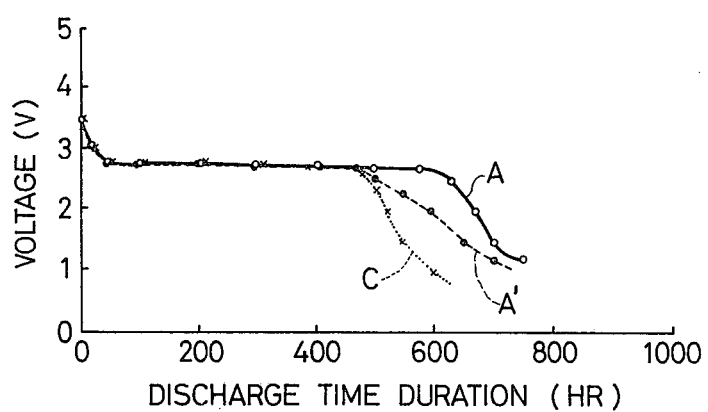
FIGS. 6 and 7 are diagrams showing the characteristics of the discharge voltage with the passage of time of a button type battery and a coin type battery using the positive plate of the invention, respectively.
Figure 7:
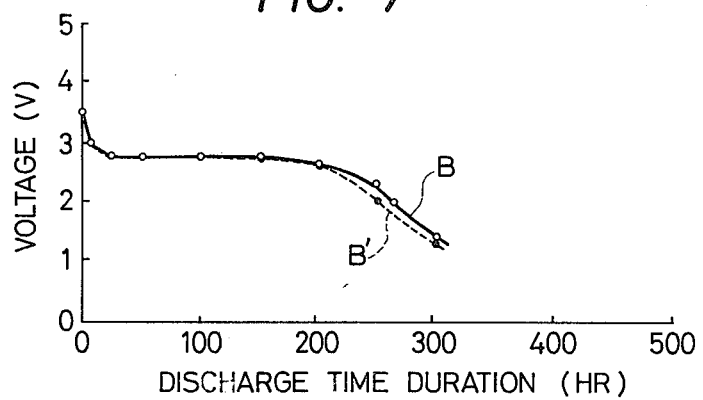

As shown in FIGS. 6 and 7, the utilization ratio of the battery till the voltage dropped down to 2 V was 81% for the battery A' of Comparative Example versus 92% for the battery A of Example 1 and 93% for the battery C of Example 2, and 93% for the battery B' of Comparative Example versus 97% for the battery B of Example 1. Thus, the batteries of Examples 1 and 2 were found to be more superior.

Incidentally, the coin type battery has a thiner positive plate and is more advantageous for the impregnation of the electrolyte than the button type battery as also observed in the conventional battery. Hence, the improvement of the utilization ratio is not so drastic.

What is claimed is:

1. A structure for a positive plate of an enclosed type of battery comprising a combination of:
    a plurality of compact particles made of a compactly aggregated composite agent containing an active material for the positive plate; and
    a plurality of coarse particles, smaller and less dense than the compact particles, made of said composite agent which has been aggregated at a pressure lower than that used to prepare the compact particles;
    the compact particles being disposed in the positive plate in such a fashion that passages between the compact particles are filled with the smaller, less dense coarse particles.

2. The structure of a positive plate of an enclosed type battery as defined in claim 1 wherein said compact particles are in contact with said coarse particles.

3. The structure of a positive plate of an enclosed type battery as defined in claim 1 wherein said compact particles consist of massive particles of said composite agent, each massive particle being compactly aggregated at a predetermined pressure, and said coarse particles consist of particles of said composite agent that are smaller than said massive particles and coarsely aggregated at a pressure lower than said predetermined pressure so that fluids passages for electrolyte penetration are defined by said coarse particles between said massive particles adjacent to one another.

4. The structure of a positive plate of an enclosed type battery as defined in claim 3 wherein said massive particles have a particle size ranging from 0.03 to 15 mm$^3$.

5. The structure of a positive plate of an enclosed type battery as defined in claim 4, wherein said particle size range is from 0.03 to 10 mm$^3$.

6. The structure of a positive plate of an enclosed type battery as defined in claim 3, wherein said composite agent consists essentially of an active material for the positive plate, an electroconductive agent and a binder; and
    further including an electrolyte impregnated in said plate;
    in combination with a negative plate, a casing carrying therein said positive plate and said negative plate, a lid, and means sealing said lid to said casing to enclose therein said positive plate and said negative plate.

7. The structure of a positive plate of an enclosed type battery as defined in claim 1 wherein said composite agent consists essentially of an active material for the positive plate, an electroconductive agent and a binder.

* * * * *